Sept. 30, 1930.   R. G. THOMPSC   1,777,055
POWER MECHANISM
Original Filed July 21, 1924   3 Sheets-Sheet 1
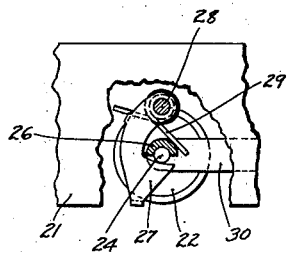
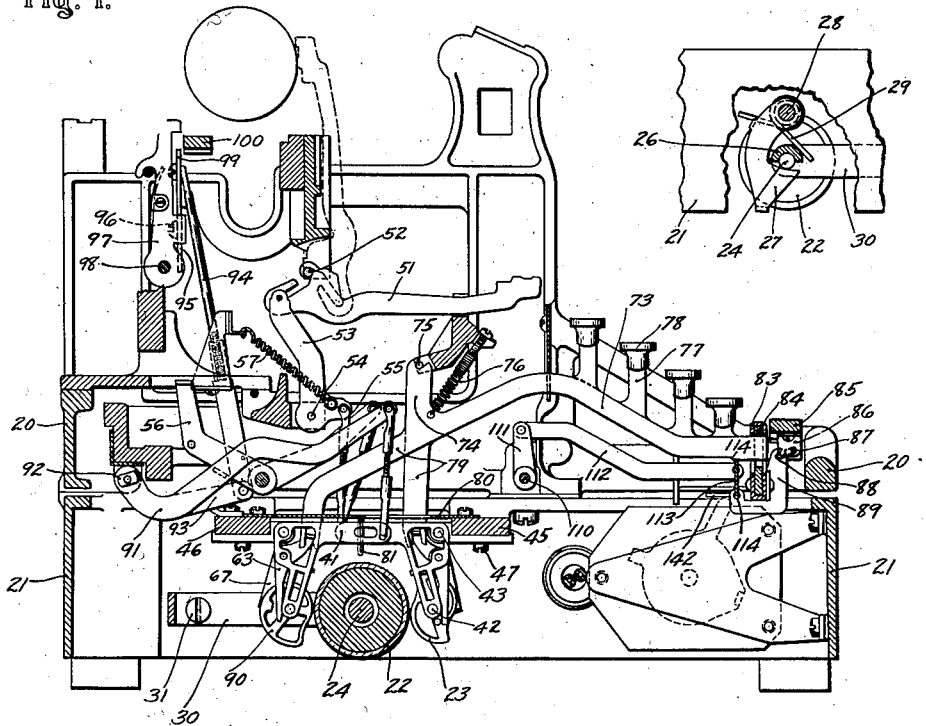
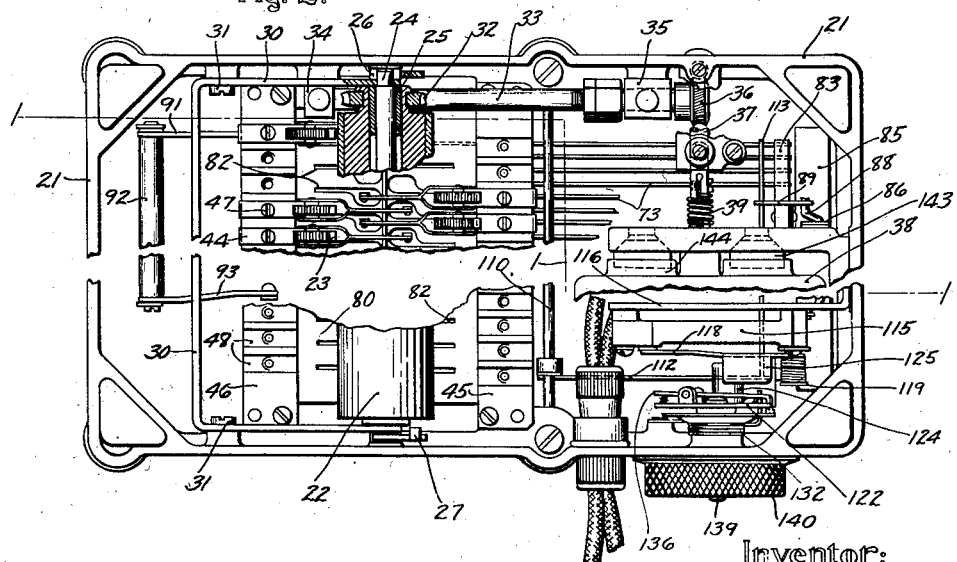
Inventor:
Russell G. Thompson
by his attorney
Farnum F. Worsey Sept. 30, 1930.   R. G. THOMPSON   1,777,055
POWER MECHANISM
Original Filed July 21, 1924   3 Sheets-Sheet 2

Inventor:
Russell G. Thompson
by his attorney
Farnum F. Worsey

Sept. 30, 1930.   R. G. THOMPSON   1,777,055
POWER MECHANISM
Original Filed July 21, 1924   3 Sheets-Sheet 3

Inventor
Russell G. Thompson
by his attorney
Farnum F. Dorsey

Patented Sept. 30, 1930

1,777,055

UNITED STATES PATENT OFFICE

RUSSELL G. THOMPSON, OF ROCHESTER, NEW YORK, ASSIGNOR, BY MESNE ASSIGNMENTS, TO ELECTROMATIC TYPEWRITERS, INC., OF ROCHESTER, NEW YORK, A CORPORATION OF NEW YORK

POWER MECHANISM

Application filed July 21, 1924, Serial No. 727,220. Renewed January 9, 1930.

This invention relates to power-mechanism suitable for actuating the type-bars and other parts of a typewriting-machine.

It has been proposed to actuate a typewriter by means of a constantly rotating roller, cooperating with a series of power-units each comprising a cam, the engagement of the cams with the roller being controlled selectively by keys. The present invention relates particularly to improvements in mechanism of this type, the object of the invention being to simplify the construction and to increase the efficiency and the reliability of such mechanism in various respects which will be pointed out.

The invention consists, accordingly, in the power-mechanism hereinafter described, as it is defined in the attached claims.

In the accompanying drawings Fig. 1 is a side-elevation, in section approximately on the line 1—1 of Fig. 2, showing a typewriter equipped with power-mechanism constructed in accordance with the present invention.

Fig. 2 is a bottom-view of the machine of Fig. 1, with the middle-part broken away.

Fig. 3 is a detail-view, in side-elevation, showing the supports of one of the roller journals.

Figure 4:
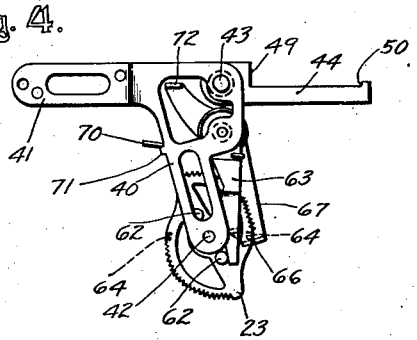
Figs. 4 and 5 are two opposite side-elevations of one of the cam-units.
Figure 6:
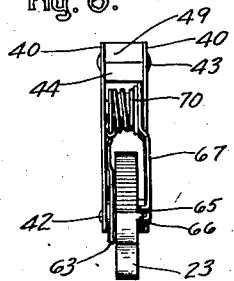
Figs. 6 and 7 are two opposite end-elevations of a cam-unit.
Figure 5:
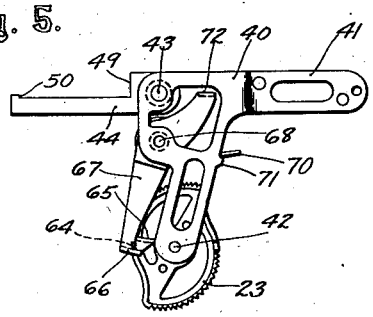
Figure 7:
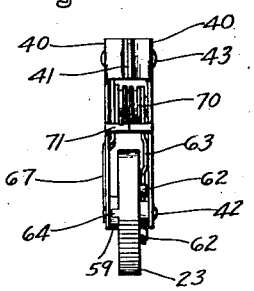
Figure 8:
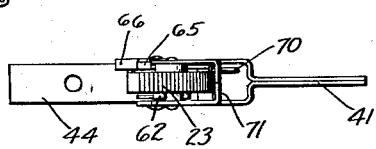
Figs. 8 and 9 are, respectively, a bottom-view and a plan of a cam-unit.
Figure 9:
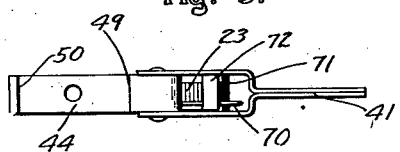

The invention is illustrated as embodied in a typewriter of the typical and well-known "Underwood" design. This machine has the usual main frame 20, while the power-mechanism is mounted within a box-like sub-frame 21 fixed to the bottom of the frame 20.

The power-roller 22, which may be covered with any suitable frictional material, such as rubber, cooperates with two rows of cams 23, arranged in front and rear of the roller. The roller turns upon a stationary rod or shaft 24, having bearing-bushings 25 at its ends which bear upon the shaft.

For purposes of adjustment and repair, it is desirable that the roller be removable readily from its operative position without disturbance of the cam-mechanisms or other parts. To this end, the shaft 24 is mounted in two half-bearings or seats 26 projecting inwardly from the sides of the frame 21 and open downwardly. The shaft is held normally against these seats by latches 27 pivoted at 28 on the frame. Each latch is formed, as shown in Fig. 3, to have a cam-like or wedging action against the shaft, and is controlled by a coiled spring 29, so that the shaft is held rigidly and accurately in place. The latches may be swung back readily by hand, however, whereupon the shaft and the roller may be at once withdrawn downwardly from between the two rows of cams.

When the roller is withdrawn, as just described, for temporary purposes, it is desirable that it remain attached to and more or less supported by the frame of the machine. For this purpose a yoke 30 is provided, this yoke consisting of an elastic strip of metal pivoted on the frame by screws 31 near the rear. The forward ends of the yoke are perforated to receive the reduced ends of the shaft 24 (Fig. 2), and the yoke swings downwardly with the shaft when the roller is removed as above described. When it is necessary to remove the roll completely from the machine, this may be accomplished by springing the arms of the yoke out of engagement with the shaft.

Figure 18:
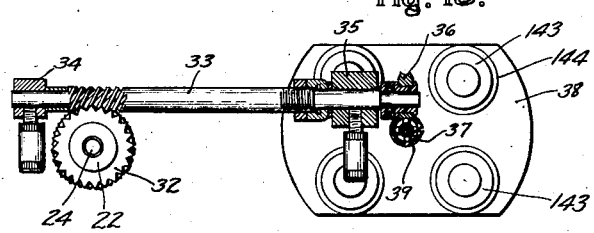
Fig. 18 is a detail view, in side-elevation and partly in section, of the mechanism connecting the motor and the power-roller.

Rotation of the power-roller is produced through a worm-wheel 32 at one end. This wheel engages a worm cut on a worm-shaft 33 which turns in bearings 34 and 35 on the sub-frame 21 (Figs. 2 and 18). The shaft 33 carries a second worm-wheel 36, which meshes with a worm-shaft 37 also turning in bearings on the frame. An electric motor 38, mounted on the frame, is connected with and drives the shaft 33 through a flexible coupling 39.

It will be apparent that the location of the worm-shaft 33 above the worm-wheel 32 permits these parts to engage and disengage, without attention on the part of the user, when the roller is moved into or out of operative position as before described. This mode of driving connection between the roller and the motor also permits the latter to be housed within the sub-frame 21 in an available space beneath the key-levers of the typewriter.

Figure 10:
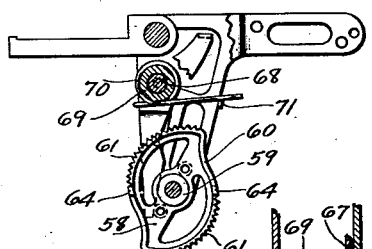
Fig. 10 is a side-elevation of a cam-unit with parts sectioned or broken away.

Each of the power-cams 23 constitutes part of a subassembly or cam-unit, of which the construction is shown particularly in Figs. 4 and 10. This unit has a frame, in the general form of a bell-crank lever, comprising two side-plates 40. At one end these plates lie close together and are riveted, so as to form a thin horizontal arm 41. For the rest, the plates are spaced apart to receive the other parts of the unit, being rigidly connected together and spaced by two studs 42 and 43. The stud 43 is embraced by a bearing-block 44, and the bearing blocks are fixed severally, by screws 47, to two transverse horizontal bars, 45 and 46, forming part of the frame of the machine. In order to determine the positions of the bearing-blocks with the necessary accuracy, the bars are provided with transverse recesses 48 to receive the blocks, and each block is provided with two shoulders, 49 and 50, to engage the edges of the bars.

The type-bars 51 are of ordinary form and are mounted on the usual pivot-rod 52. Each type-bar is actuated by a bell-crank lever 53 pivoted at 54. The shorter, horizontal arm of lever 53 is connected, by an adjustable link-rod 55, with the arm 41 of the corresponding cam-unit. In the illustrated machine the spacer-mechanism also is actuated by a cam-mechanism, through a bell-crank lever 56. Each lever 53 is provided with a spring 57 to maintain firm engagement of the cam with the power-roller during operative movement of the cam, and for the further purpose of expediting the return movement of the parts.

The details of the cams and their supporting frames are shown in Figs. 4 to 12. The cam is drawn from sheet-metal and it comprises a web 58 to which a hub 59 is fixed. A peripheral flange 60 provides the working face of the cam, and it is formed to provide two salient operative parts 61 and two intermediate concave idle parts. The parts 61 are serrated to improve their hold upon the power-roller. The web 58 is cut away partially to lighten the cam. Upon its solid portion it is provided with two integral projections or lugs 62, which cooperate with an arm 63. Two other projections or detents 64 are formed integrally at the edge of the flange-portion of the cam, and they cooperate with stop-lugs 65 and 66 on a stop-lever 67.

The stop-lever 67 is fixed on one end of a pivot 68 which turns freely in holes in the side-plates 40. The arm 63 is fixed to a hub 69 which turns upon the pivot 68, so that the stop-lever and the spring-arm have independent pivotal movement about a common axis. The arm is controlled by a spring 70, coiled around the hub, and bearing, at one end, against the arm and, at the other end, against a lug 71 on the side-frame. This spring presses the arm constantly against the lugs 62.

The upper end of the stop-lever 67 is bent to one side, forming a lug 72, which is engaged by the forked rear end of the corresponding key-lever 73. These levers have upwardly-projecting arms 74 which are notched at their ends to engage a pivot-rod 75 on the frame of the machine. Springs 76 attached to the key-levers hold them up against the pivot and serve also to cause their return-movement after they have been depressed and released. Each key-lever extends forwardly to the front of the machine, but is provided, at an intermediate point, with an upright projection 77 with the usual head or key 78.

The rearward portions of the key-levers constitute downwardly projecting arms 79, which are arranged in two rows, cooperating with the two rows of cam-mechanisms.

A guide-plate 80 is secured to the two frame-members 45 and 46, and this plate is provided with slots 82 in which the rear ends of the key-levers move, these slots having enlarged ends through which the link-rods 55 pass. The middle part of the guide-plate is folded and bent downwardly, and this part is slotted to receive the arms 41 of the cam-units. By these means the correct relative lateral positions of the parts are strictly maintained independently of their pivotal supports. The guide-plate serves also as a shield to protect the cam-units from falling dirt.

The movement of the key-levers necessary for operating the stop-levers is very slight, and it is desirable to control and limit it positively and accurately. For this, among other reasons, the key-levers are all, as before stated, extended to the front of the keyboard, and their forward extremities move in vertical slots in a guide-bar which comprises a metal channel 83 enclosing a strip 84 of bakelite-micarta or similar material.

This guideway supports the levers against lateral bending, and limits their movement in accordance with the length of the slots, and this control is positive and accurate by reason of the remoteness of the guide-bar from the pivotal support of the key-levers.

The usual spacer-bar 85 may be mounted, at one end, on one of the key-levers (not shown) so as to control the corresponding cam-unit. To support the opposite end of the bar and cause the bar to move vertically as a unit, a parallel-motion mechanism is used, comprising lugs 86 projecting from the bottom of the bar near its ends, and a rod 87 journalled in the lugs and having cranked ends 88 which are journalled in two lugs 89 fixed to the stop-bar. When either end of the spacer-bar is depressed or raised the cranked rod causes a similar movement of the other end.

The operation of the cam-unit is as follows: the cams occupy normally the positions shown in Fig. 4, which represents one of the forward bank of units. In this position the impeller-arm 63 presses against the impeller-lug 62 which at the time is in the lower position, and tends to turn the cam in a clockwise direction. This is prevented, however, by the engagement of one of the detents 64, on the cam, with the lower stop-lug 66 on the stop-lever. If, however, the corresponding key-lever be operated, the upper end of the stop-lever is swung rearwardly, and its lower end forwardly, thus releasing the cam, which then turns under the influence of the impeller-arm. In doing so the lower serrated lobe of the cam is brought into engagement with the power-roller, which turns in a counter-clockwise direction and therefore causes a continued rolling movement of the cam until the high point has been reached and passed. This causes the whole cam-unit to swing about the pivot 43 so as to pull down the corresponding link-rod and actuate one of the type-bars or any other mechanism with which the cam unit is connected.

After the high point of the cam is passed the cam loses contact with the roller, but the impeller-arm tends to continue the rotation until the second detent 64 engages one of the stop-lugs. Since the half-rotation of the cam consumes only a small fraction of a second, it is impossible to release the key within this short interval, so that it is the lug 65 which is first engaged, but upon the release of the key and the return of the stop-lever to normal position, this lug disengages the detent, the impeller-arm rotates the cam slightly, and the detent then engages the stop-lug 66.

The action of the cam-mechanism has been described with respect to one of the forward bank of cam-units: in the case of those of the rear bank the operation is analogous, but the directions of movement, and the order of operation of the stop-lugs, is reversed.

It should be noted that the lug 72 on the stop-lever is so located that it moves through only a short arc as the cam-unit swings, and that this arc is approximately parallel with the length of the slot in the end of the key-lever, so that the operative relation of these parts is not appreciably disturbed by the action of the cam.

Figure 17:
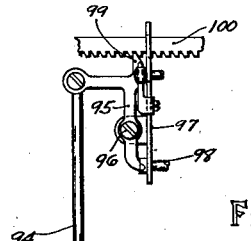
Fig. 17 is a rear elevation of the power-actuated back-spacing mechanism.

In the illustrated machine a cam-unit is provided for operating the back-spacing mechanism. Since this mechanism must move the weight of the carriage, and do so in opposition to the feed-spring, a cam of special shape is provided to accomplish this in the desirable short space of time with the least possible strain upon the mechanism. This cam 90 (Fig. 1) is adapted to make a complete rotation in performing its function. It is connected, through an arm 91, with a rock-shaft 92 forming part of the usual back-spacer mechanism. As shown in Figs. 1 and 17, a second arm 93, on the rock-shaft, is connected in the usual manner, through a rod 94, with a lever 95, pivoted at 96 on a swinging arm 97. The arm 97 is pivoted at 98 on the frame of the machine. A tooth 99 on the lever 95 cooperates with a rack 100 on the carriage, but is normally out of engagement therewith. When the rod 94 is drawn downwardly, the first effect is to swing the arm 97, with the lever 95, forwardly so as to engage the tooth 99 with the rack; continued movement of the rod then causes the lever to swing upon its pivot 96 and move the carriage.

The construction thus briefly described is familiar to those skilled in the art, and constitutes no part of the invention, but it is typical of back-spacer mechanisms in the respect that its action involves two phases: first, what may be described as an idle movement of the parts, for the purpose merely of bringing them into operative engagement; and second, an active movement during which the carriage is shifted. The preliminary idle movement may be performed very rapidly, owing to the slight inertia of the parts involved; but the movement of the carriage should be performed more deliberately, and preferably with a smooth acceleration followed by a smooth retardation.

The back-spacer cam 90 of the present invention is designed to perform its functions in the preferable manner just described. Its form is shown on an enlarged scale, in Fig. 11. The operative serrated surface of the cam is shown as divided into three sections, by dot-and-dash lines. The first section 101, extending between the lines 102 and 103, has a rise sufficient to engage the tooth 99 with the rack 100, that is to complete the idle movement before described, and this section occupies less than half of the cam. Its form is not important, but is shown as adapted to produce a substantially uniform rapid movement of the cam-unit.

The second section 104 of the cam, between the lines 103 and 105 is formed to give a rise or acceleration beginning with substantially zero and uniformly accelerating to the line 105: from this line to the line 107 the section 106 has a retarding action, the rise of the cam diminishing to substantially zero at the end.

The effect of the sections 104 and 106 of the cam 90 is to move the carriage at a speed rising from zero to a maximum and then diminishing again to zero, whereby the required movement is accomplished with the minimum strain upon the mechanism and without danger of the carriage overrunning.

Figure 11:
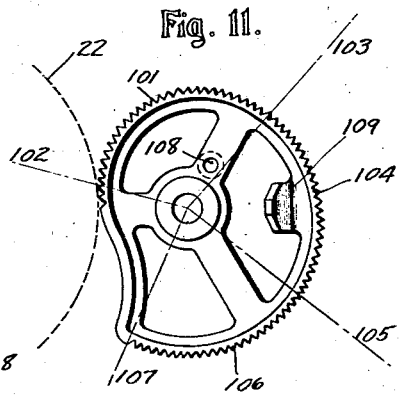
Fig. 11 is a side-elevation, on an enlarged scale, of the cam used to actuate the back-spaced mechanism.
Figure 12:
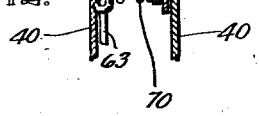
Fig. 12 is an enlarged sectional detail of one of the cam-units.
Figure 13:
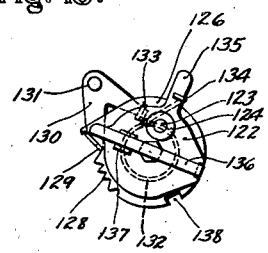
Fig. 13 is an elevation, from the inside, of the manually operable mechanism for controlling the motor.

Since the cam 90 makes a complete rotation at each operation it requires only one lug 108 to cooperate with the impeller-arm. Only one detent 109 is required, for the same reason. This detent is formed in a special manner, by shearing and bending a part of the web of the cam so as to cause it to project within and beyond the marginal flange of the cam, as shown in Fig. 11.

Figure 16:
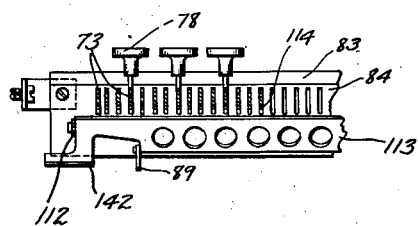
Fig. 16 is a detail view, in rear elevation, showing parts of the guiding and locking means for the key-levers.

In typewriters of ordinary construction it is customary to provide means for locking the key-levers when the carriage reaches the marginal stop, and such locking-means are arranged to cooperate with the levers at points in the rear of the key-board. In the present machine, owing to the relatively slight operative movement of the key-levers, the locking means do not operate with the desired precision when so arranged. Accordingly, they are arranged to cooperate with the forward extremities of the key-levers, as shown in Figs. 1, 2, and 16. A rock-shaft 110, journalled on the frame of the machine, corresponds to that used in the lock-mechanism of the ordinary Underwood design, and it may be connected by the usual means (not shown) with the carriage. An arm 111 rising from the rock-shaft, is connected, by a rod 112, with a sheet-metal bar 113 which is pivoted at its ends in line with its lower edge, upon the lugs 89 fixed to the stop-bar 83. Each key-lever has a shoulder 114 at its lower edge, and when the lock-bar 113 is in vertical position, as in Fig. 1, its upper edge lies close beneath these shoulders and prevents the depression of the key-levers.

The force with which the type-bars are operated may be varied by varying the speed of rotation of the power-roller, and this is necessary in order to adjust the machine for different kinds of work. Accordingly, means are provided for varying the speed of the motor, as well as starting and stopping it. These means comprise a rheostat 115, mounted on a plate 116 fixed to the front-member of the frame 21. The rheostat has the usual series of contacts 117, which are swept by a contact-arm 118 pivoted on a stud 119.

The rheostat-arm is moved by means of a manually-operable member or head 120 provided with lugs by which it may be conveniently turned. The head is fixed on the outer end of a hollow shaft 121, which turns in a bearing on the frame of the machine and carries a plate 122 on its inner end. A stud 123 fixed to the plate carries a roller 124 of insulating material, which rests between two lateral flanges 125 on the contact-arm 118. Rotary motion of the head 120 is thereby communicated to the contact-arm, causing the latter to swing and traverse the contacts.

Figure 15:
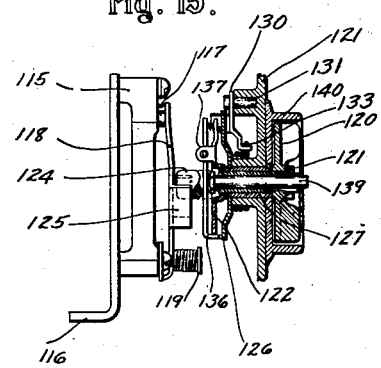
Fig. 15 is a plan-view, partly in section, of the parts shown in Figs. 13 and 14, together with the rheostat.

Means are provided for arresting the contact-arm upon the contact corresponding to a predetermined speed, and for returning it automatically to off position when released. These means comprise a stop-plate 126 fixed on the inner end of a sleeve 127 which surrounds loosely the shaft 121. The stop-plate has a series of notches 128 in its edge which cooperate with a detent-lug 129 carried by a bell-crank lever 130. This lever is pivoted at 131, on the frame of the machine. A spring 132, coiled around the bearing-boss in which the sleeve 127 turns, has a hooked end 133 engaging the lever 130, while its other end 134 engages an arm 135 on the plate 122. A latch 136 is pivoted between lugs 137 on the plate 122, and is spring-pressed to cause its bent end (Fig. 15) to enter a notch 138 in the edge of the stop-plate whenever the two plates are in a certain relative position.

Figure 14:
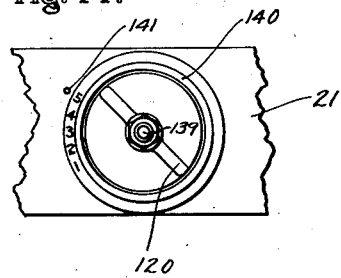
Fig. 14 is an outside elevation of the same.

A plunger 139, passing loosely through the shaft 121, may be used to release the latch, by pushing against the outer end of the plunger. A knurled knob 140, fixed on the outer end of the sleeve 127, may be used to turn the sleeve and the stop-plate, and the position of the latter is indicated by graduations on the flange of the knob (Fig. 14) which cooperate with an indicator 141 on the frame of the machine.

The operation of the motor-controlling means is as follows: To start the motor the operator turns the head 120, causing the contact arm to move from off position and traverse the contacts until the latch engages the notch in the stop-plate, thus arresting the movement. The head 120 may then be released, and the latch will hold the parts in position, contrary to the force of the spring 132, which tends to return the parts to off position.

The motor will now run at a speed dependent upon the position of the stop-plate, which position is controlled by the detent 129 engaging one or another of the notches 128. If it be desired to change the speed, this is done by turning the knob 140 forcibly in one direction or the other, thus overcoming the resistance of the detent. To stop the motor it is necessary only to press on the plunger 139, thereby releasing the latch and permitting the spring 132 to return the parts to off position.

It is desirable to prevent depression of the key-levers whenever the power-mechanism is not operating. For this purpose the locking-bar 113 is provided with an arm 142, which is so located as to be engaged and raised by the arm 135 when the rheostat is in off position, whereby the locking bar is moved to and held in operative position, as shown in Fig. 1.

It is desirable, in a machine of this kind, that all noise from the motor be suppressed, as far as possible. For this purpose the motor is mounted on the sub-frame 21 by means including plugs 143 of cork or other yielding material, which are seated in sockets 144 on the ends of the motor and which engage similar sockets in the frame. These plugs, together with the flexible coupling 39, insulate the motor from the other parts of the machine, so far as transmission of vibrations is concerned.

While the power mechanism herein described is particularly useful in manually controlled typewriting machines, it may also be used in connection with machines of other types in which a series of instrumentalities are selectively operated by power, under the control of a set of manually operated keys. Some features of the invention are also useful in machines in which the power units are controlled, not by keys, but by the operation of automatic means adapted to cause operation of the type bars or corresponding instrumentalities in a predetermined order.

The invention is not limited to the details of construction of the embodiment herein described and illustrated in the accompanying drawings, but it may be embodied in various other forms within the scope of the following claims.

The invention claimed is:

1. In power-mechanism of the kind described, the combination of a frame having side-plates; a half round socket, on the inner surface of one of said side-plates, opening downwardly; a rotary drive-member; a shaft, on which the drive-member turns, of which one end is normally seated in said socket; and a manually retractible spring-controlled latch having a wedging action against the end of said shaft to press and hold it firmly in the socket.

2. In power-mechanism of the kind described, the combination of a frame; a rotary drive-member; a shaft on which the drive-member turns; a yoke pivoted to the frame and connected, at its ends, to the ends of said shaft; and means, in addition to said yoke, for securing the ends of the shaft to the frame with the drive-member in operating position.

3. In power-mechanism of the kind described, the combination of a frame; a rotary drive-member; a shaft on which the drive-member turns; a yoke pivoted to the frame and perforated, at its ends, to receive the ends of said shaft, the yoke being resilient so that it may be sprung into and out of engagement with the shaft; and means, in addition to said yoke, for securing the ends of the shaft to the frame with the drive-member in operating position.

4. In power-mechanism of the kind described, the combination of a power-lever; a cam journalled on the power lever and provided with a detent and an impeller-lug projecting from opposite sides; and a stop-lever and a spring-controlled impeller-arm having a common pivotal support upon the power-lever and cooperating with said detent and impeller-lug, respectively.

5. In power-mechanism of the kind described, the combination of a power-lever comprising two parallel members rigidly interconnected at separated points; a cam rotatably mounted between said members and provided with a detent and an impeller-lug; a pivot loosely mounted, at its ends, in said members; a stop-lever fixed to said pivot and cooperating with said stop-lug; an impeller-arm cooperating with said impeller-lug and provided with a hub embracing and rotatable about said pivot; and a spring coiled about said hub and interconnecting the impeller-arm and the power-lever.

6. In power-mechanism of the kind described, the combination of a series of power-units; a bank of keys for controlling the power-units; a series of key-levers; upon which the keys are mounted; pivoted at the rear of the bank of keys but extending to the front of the bank; and a slotted guide engaging the forward ends of the key-levers.

7. In power-mechanism of the kind described, the combination of a series of power-units; a bank of keys for controlling the power-units; a series of key-levers, upon which the keys are mounted, pivoted at the rear of the bank of keys but extending to the front of the bank; and means cooperating with the forward ends of the key-levers, for limiting their pivotal movement.

8. In power-mechanism of the kind described, the combination of a series of power-units; a bank of keys for controlling the power-units; a series of key-levers, upon which the keys are mounted; pivoted at the rear of the bank of keys but extending to the front of the bank; and a lock-member movable into and out of position to engage the forward ends of the key-levers and operable, when so engaged, to prevent operative movement of the levers.

9. In power-mechanism of the kind described, the combination of a series of power-units; a bank of keys for controlling the power-units; a series of key-levers, upon which the keys are mounted, extending to the front and the rear of the bank of keys and engaging the power-units at their rear ends; a pivotal support for the key-levers at an intermediate point in their length but in the rear of the keys; and slotted guides engaging and guiding the key-levers adjacent both ends.

10. In power-mechanism of the kind described, the combination of a series of power-units each comprising a swinging power-lever; a series of pivoted key-levers connected, respectively, with the power-units for controlling the latter; and a guide-plate, fixed above the power-units and having slots which receive and guide the ends of the power-levers, and slots which receive and guide the adjacent ends of the key-levers.

11. In combination with the back-spacer mechanism of a typewriter, power-mechanism for actuating the back-spacer comprising means for imparting rapid motion thereto during the first part of the operation thereof, and for imparting thereafter a further motion which is first accelerated and then retarded, such further motion coinciding with the period of traversing motion of the carriage of the typewriter.

12. In combination with the back-spacer mechanism of a typewriter, power-mechanism, for actuating the back spacer, comprising a cam formed to actuate the back-spacer first to engage it with the rack of the carriage-escapement, and thereafter to impart to the carriage a back-spacing movement which is first accelerated and then retarded.

13. In combination with the back-spacer mechanism of a typewriter, power-mechanism, for actuating the back-spacer, comprising a cam having first a portion formed for substantially uniform motion, and a succeeding portion formed to give motion accelerated from approximately zero, the operation of said second portion being timed to correspond with the traversing movement of the carriage of the typewriter.

14. In power-mechanism of the kind described, a cam formed integrally of sheet-metal and comprising a web; a serrated flange at the periphery of the web; and a stop-lug cut from the web and bent laterally so as to project beyond the edge of the flange.

15. In combination with a typewriter: power-mechanism therefor comprising a rotary drive-member journalled transversely beneath the type-mechanism; power-units actuated by said drive-member and connected with the respective type-members of the machine; a power-shaft geared to one end of said drive-member and journalled on and within the frame of the machine; an electric motor yieldingly mounted within and upon the frame of the machine; and means, including a resilient coupling, for connecting the motor-shaft with the power-shaft to actuate the latter.

16. In combination with the type-mechanisms of a typewriter: power-mechanism comprising a drive-roller journalled transversely beneath the type-mechanisms; power-units, each comprising a bell-crank lever with a depending arm and a substantially horizontal arm, and a cam journalled on the depending arm and cooperable with said roller, said bell-crank levers being pivotally mounted in two ranks, those in one rank having their depending arms in front of the roller and those in the other rank having their depending arms behind the roller, while the horizontal arms of the two ranks extend in opposite directions across the top of the roller; and links extending from said horizontal arms to the respective type-mechanisms.

17. In power-mechanism of the kind described, the combination, with a drive roller, of cams cooperable therewith and arranged in two ranks on opposite sides of the roller; and bell-crank levers, also arranged in two ranks, each lever having one arm on which one of said cams is journalled, and a second arm extending across the roller in the direction of the opposite rank of levers.

18. In power-mechanism of the kind described, the combination of a frame comprising two parallel cross-bars; a drive-roller journalled below and parallel with said cross-bars; two ranks of bell-crank levers having pivotal bearings on the cross-bars, respectively, the levers of the two ranks having upper arms, extending across the roller in opposite directions, and depending arms on opposite sides of the rollers; cams carried by said depending arms and cooperative with the roller; and a plate mounted upon and extending between said cross-bars and provided with a depending central flange, which is slotted to receive and guide the upper arms of the levers.

RUSSELL G. THOMPSON.